: 3,146,863
Patented Sept. 1, 1964

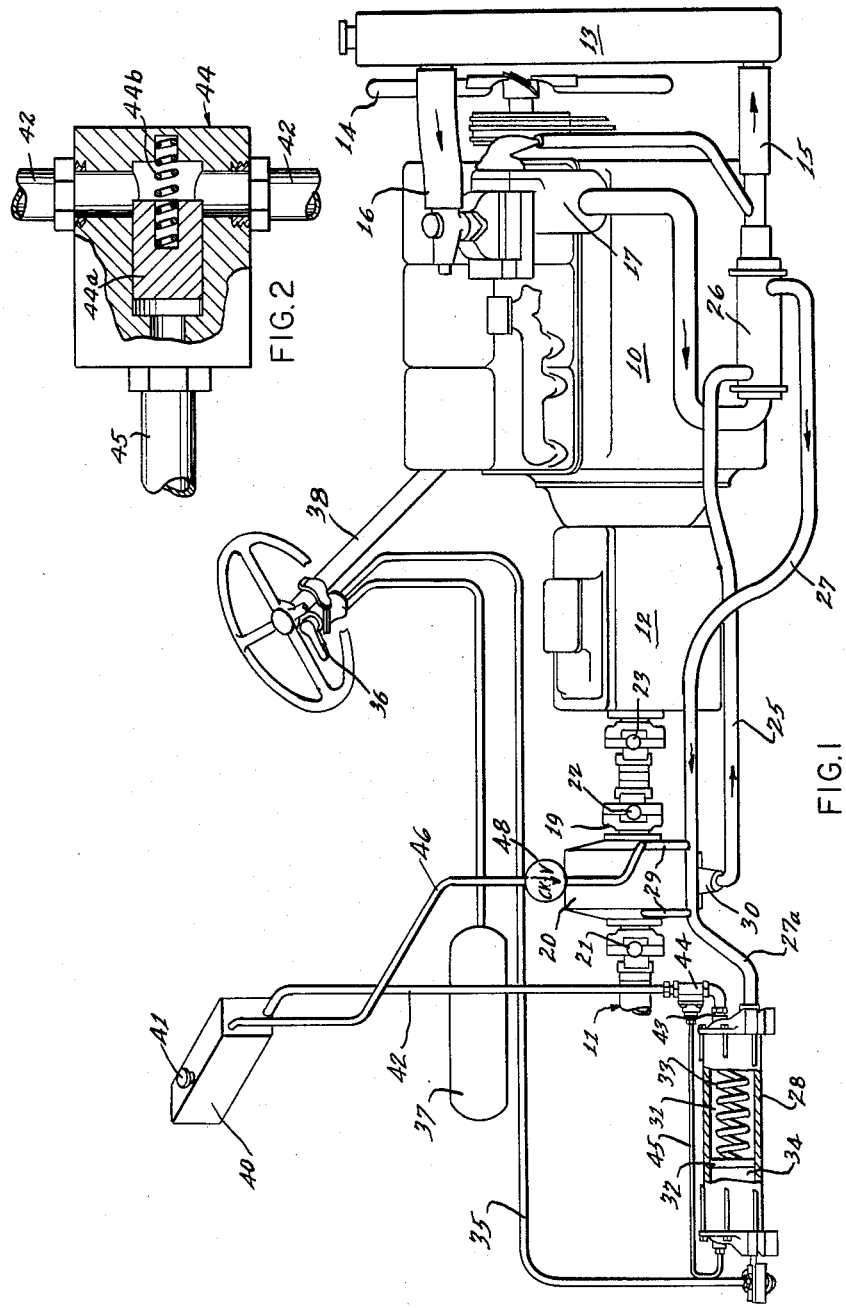

3,146,863
**AUTOMATICALLY COMPENSATED HYDRO-
DYNAMIC RETARDER FILL SYSTEM**
Edward J. Herbenar, Detroit, and Norman A. Stenzel, Clawson, Mich., assignors to Thompson Ramo Wooldridge Inc., Detroit, Mich., a corporation of Ohio
Filed Mar. 21, 1961, Ser. No. 97,331
5 Claims. (Cl. 188—90)

The present invention relates to hydrodynamic brake systems for vehicles or the like and is, more particularly, concerned with the provision of an improved brake fluid circulatory system designed to maintain the system fluid at the proper operating level at all times in spite of leakage, evaporation, or other possible liquid losses that may from time to time occur in operation.

The hydrodynamic brake system of the present invention comprises a completely closed liquid circuit of the type generally illustrated in United States Letters Patent No. 2,963,118 dated December 6, 1960. In such a system a volume of brake liquid in direct communication with the liquid in the hydrodynamic brake itself is displaced into the hydrodynamic brake unit under a yielding pneumatic pressure. Upon the application of loads to the hydrodynamic brake the braking liquid is urged out of the brake into the displaceable volume against the force of the pneumatic pressure. This resiliency in the system prevents overloading not only the hydraulic circuitry but also the vehicle axle which, if braked to excess, may fail. Systems incorporating the arrangement shown in the above-mentioned United States Patent have proven eminently satisfactory in actual use. Due to the fact, however, that installations of the type here involved are employed in extremely heavy duty trucks and off-the-road vehicles, the strains on the circuitry are great and small leaks occasionally develop. In accordance with the present invention, means are provided for maintaining the liquid level in the system at the desired predetermined value without in any way adversely affecting the operating characteristics of the system when under load.

In accordance with the present invention, a reservoir tank is mounted at a level above both the hydrodynamic retarder and the circuit loading cylinder. Braking liquid drains under the influence of gravity from the reservoir tank into the loading cylinder at any time the retarder is not applied. This insures that the loading cylinder is at all times filled. Should there be any excess air in the hydrodynamic retarder system, this air will rise from the loading cylinder into the reservoir when the hydrodynamic brake is not applied. The reservoir is vented to atmosphere. At times when the retarder is not being employed as a braking means, excess liquid in the retarder system will be circulated by the retarder into the loading cylinder and then into the reservoir by way of a pilot valve sensitive to a positive pneumatic pressure applied when the brake is to be employed, to close the connection between the reservoir and the loading cylinder only upon application of pneumatic pressure to energize the brake. To permit such excess fluid to leave the circulatory system under the no-load condition, air may be bled into the circulatory system through a lead line from the reservoir by way of a check valve preventing return flow to the reservoir.

In accordance with the present invention, therefore, a hydraulic circulatory system is provided which is, during operation of the hydrodynamic retarder, completely closed and operative as a closed system. At the same time, however, means are satisfactorily provided for replenishing any slight leakage that may from time to time occur from the system. As a result, a completely safe and absolutely reliable hydrodynamic brake is provided.

It is, accordingly, an object of the present invention to provide an automatically compensating closed circuit hydrodynamic braking system.

Another object of the present invention is to provide a hydrodynamic braking circuit automatically replenishing any leakage.

Still a further object of the present invention is to provide an improved closed circuit hydrodynamic braking system incorporating a constant braking liquid level at all times independently of leakage between brake applications. A feature of the invention is the provision of low-pressure application of brake liquid to the brake circulating system during periods when the brake is not applied.

Still a further feature of the invention is the provision of a pilot valve-controlled low pressure fluid application to the circulating system wherein the pilot valve is under control of and is sensitive to pneumatic brake applying means.

Still other and further objects and features of the present invention will become apparent from a consideration of the attached drawings wherein one embodiment of the invention is shown by way of illustration only, and wherein a hydrodynamic braking system incorporating the present invention is shown diagrammatically.

As shown on the drawings:

FIGURE 1 of the drawings illustrates the automatically compensated hydrodynamic retarder system of the present invention in schematic form; and FIGURE 2 is an enlarged detail view in cross-section of the pilot valve 44 generally illustrated in FIGURE 1.

As may be seen from a consideration of the drawings, the present system is intended for vehicular use. In the embodiment shown, an automotive vehicle engine 10 rotates output propeller shaft 11 by way of a conventional gear reduction transmission 12. The engine 10 incorporates a liquid coolant system comprising an air-to-coolant radiator 13 through which air is drawn by means of a fan 14 and through which coolant is circulated via conduit 15 and 16 in the direction of the arrow applied thereto. The coolant is preferably circulated by means of a conventional liquid circulating pump 17 driven with the fan 14.

In accordance with the present invention, the propeller shaft 11 is braked by means of a hydrodynamic brake 20 of conventional configuration, such as for example in accordance with the brake illustrated in the above-mentioned United States Letters Patent No. 2,963,118. The brake 20 may be placed at any convenient point between the engine 10 and the vehicle rear wheels, not shown, but in the embodiment illustrated, is associated with an intermediate propeller shaft 19 connected by universal joints 21 and 22 to the propeller shaft 11 and the output universal joint connection 23 of the transmission 12. The outer housing of the brake 20 is rigidly secured to the vehicular frame via bolts or any other convenient method comprising no part of the present invention.

The hydrodynamic braking liquid circulates in a closed hydraulic circuit formed by the brake outlet conduit 25, heat exchanger 26, inlet conduit 27, and loading cylinder 28. The inlet conduit 27 passes hydraulic liquid into the brake 20 by way of an inlet connection, illustrated as a pair of inlets 29 and, similarly, the outlet conduit 25 is connected to the brake 20 by way of a connection 30. As shown, the loading cylinder 28 is connected to a spur 27a of inlet line 27 and as may be seen from a consideration of the partially cut-away view of the loading cylinder, it contains a body of hydraulic liquid 31 contained behind a piston 32 which is biased towards the left or loaded position by a spring 33. Air under pressure is introduced to the area 34 on the left side of the piston or diaphragm 32 by means of a control air pressure conduit 35 which supplies air or other gas under pressure from tank 37 by way of manual control valve 36 secured to the steering column 38 of the vehicle.

The closed brake circuit as thus far described above is substantially in accordance with the arrangement illustrated in the above-mentioned United States Letters Patent No. 2,963,118. The present invention incorporates a safety filling system that automatically maintains the quantity of liquid in the braking circuit at a constant level when the loading cylinder piston or diaphragm 32 is in its left-handmost or maximum storage, position and no gas under pressure is applied to the chamber 34 via valve 36. This is accomplished by provision of a reservoir 40 opened to atmosphere at filler cap 41 and connected to the loading cylinder 28 by way of a gravity feed conduit 42 entering the loading cylinder 28 at the top edge thereof as indicated at connection 43. Pilot valve 44 is positioned in conduit 42 and comprises a conventional valve core 44a normally biased to the open position by spring 44b allowing liquid flow into chamber 31 via conduit 42, and movable to the closed position upon the application of pressure by way of pilot conduit 45 which is connected with chamber 34 of the loading cylinder 28, or alternatively, with conduit 35 at any point downstream of the valve 36. With this arrangement it will be apparent that during such time as pressure is applied to the piston 32 by way of control conduit 35, to force liquid from the loading cylinder 28 into the hydrodynamic brake 20, the pilot valve 44 will be maintained closed and no braking liquid may flow from the loading cylinder 28 to the reservoir 40 or, alternatively, from the reservoir 40 to the loading cylinder 28. In these circumstances, after completion of the braking cycle and discontinuance of braking effort, which is occasioned by operation of the manual valve 36 which vents conduit 35 to atmosphere and closes off connection from the storage tank 37 to conduit 35, spring 33 will move the piston or diaphragm 32 toward the left permitting pumping of the braking liquid from the retarder 20, by action of a retarder vane, into the loading cylinder chamber 31, emptying the brake 20. If a leak has developed somewhere in the braking system and the liquid level is low, liquid will flow down to conduit 42 into the chamber 31 to make up such loss.

It will be observed that during a period of complete vehicle inactivity, such as when the vehicle stands overnight or the propeller shaft 11 is not being driven, either by the vehicle engine or the vehicle wheel and the brake is not applied by means of the control valve 36, braking liquid may fill both the retarder 20 and the loading cylinder chamber 31. Upon starting the vehicle, the retarder 20 will pump the liquid directly into the chamber 31 and thence up into the reservoir 40 substantially immediately. In this operation, the volume of the retarder will preferably be replaced by air. This air is introduced into the system by way of vent conduit 46 and check valve 48 which permits air to flow into the retarder 20 at the inlet of the retarder to replace the liquid pumped out. Upon closure of the control valve 36 and hence upon closure of conduit valve 44, however, a positive pressure is immediately built up in the loading cylinder chamber 31 and in the circulating conduits 25 and 27 which closes the check valve 48 and effectively completely closes the circulating system for brake operation. The conduit 46 may be connected into the inlet of the retarder 20 immediately at the inlet connection 29 or between that connection and the outlet 30 of the retarder in the downstream line conduits 25 or 27. Any excess air accumulation in the system will rise from the loading cylinder to the reservoir 40 via conduit 42 when pilot valve 44 is open.

It will be realized by those skilled in the art that with the control system above described, the liquid level in the circulating system at the time of brake application is maintained substantially constant at all times. If slight leakage occurs in the conduit system, this leakage is replenished by means of the supply in reservoir 40. Accordingly, the hydrodynamic brake will be operating at a completely full, accurately controlled level at all times upon application of the pressure by way of valve 36. As a result of this arrangement, maintenance of the system is greatly simplified and hence reliability of the system in the field at points remote from repair facilities, is greatly increased. It will be apparent further to those skilled in the art that variations and modifications may be made in the system as illustrated without departing from the scope of the novel concepts of the present invention. Accordingly, it is our intention that the scope of the invention be limited solely by that of the hereinafter appended claims.

We claim as our invention:

1. In combination, a shaft, a hydrodynamic brake associated with said shaft for retarding the rotation thereof, a closed brake fluid circulating system including an inlet conduit for conducting fluid into said brake and an outlet conduit providing a fluid relief from said brake, means connecting said conduits into a closed system, and means for selectively rapidly introducing thereto at a predetermined adjustable high yielding pressure or withdrawing therefrom brake fluid while maintaining confinement of said fluid, said last named means including means in said closed system displacing a maximum volume of said fluid approximatley equal to the full braking volume of said brake and further including means applying said pressure to said displacing means to yieldingly displace fluid into said brake or alternatively removing said pressure to displace fluid from said brake into said volume displacing means and means in said closed brake fluid circulating system responsive to reduction of said yielding pressure to atmospheric pressure to open said closed brake fluid circulating system to a brake fluid reservoir positioned above said closed brake fluid circulating system and connected thereto to maintain the liquid level in said circulating system at a desired constant operating value.

2. In combination in an automotive vehicle having a drive shaft, a hydrodynamic brake connected with said shaft for retarding the rotation thereof, a closed brake fluid circulating system including an inlet conduit for conducting fluid into said brake and an outlet conduit providing a fluid relief from said brake, means connecting said conduits into an operatively closed system and means for selectively rapidly introducing to said system at a predetermined adjustable high yielding pressure and subsequently withdrawing therefrom brake fluid while maintaining confinement of said fluid, said last named means including a loading cylinder in said closed system displacing a volume of fluid approximately equal to the full braking volume of said brake and including means applying said yielding pressure to said loading cylinder to yieldingly displace breaking fluid into said brake, and means in said closed brake fluid circulating system responsive to reduction of said yielding pressure to atmospheric pressure to open said closed system to a replenishing supply of brake liquid.

3. In combination in an automotive vehicle having a drive shaft, a hydrodynamic brake connected with said shaft for retarding the rotation thereof, a closed brake fluid circulating system including an inlet conduit for conducting fluid into said brake and an outlet conduit providing a fluid relief from said brake, means connecting said conduits into an operatively closed system and means for selectively rapidly introducing to said system at a predetermined adjustable high yielding pressure and subsequently withdrawing therefrom brake fluid while maintaining confinement of said fluid, said last named means including a loading cylinder in said closed system displacing a volume of fluid approximately equal to the full braking volume of said brake and including means applying said yielding pressure to said loading cylinder to yieldingly displace braking fluid into said brake, and further means responsive to reduction of said yielding pressure to atmospheric pressure to open said closed system to a replenishing supply of brake liquid, said further means including a reservoir open to atmospheric pressure and positioned for gravitational feed into said loading cylinder by way of a pilot valve normally open and responsive to the application of said yielding pressure to said braking liquid to close to thereby prevent movement of braking liquid from said loading cylinder to said reservoir and vice versa.

4. In combination in an automotive vehicle having a drive shaft, a hydrodynamic brake connected with said shaft for retarding the rotation thereof, a closed brake fluid circulating system including an inlet conduit for conducting fluid into said brake and an outlet conduit providing a fluid relief from said brake, means connecting said conduits into an operatively closed system and means for selectively rapidly introducing to said system at a predetermined adjustable high yielding pressure and subsequently withdrawing therefrom brake fluid while maintaining confinement of said fluid, said last named means including a loading cylinder in said closed system displacing a volume of fluid approximately equal to the full braking volume of said brake and including means applying said yielding pressure to said loading cylinder to yieldingly displace braking fluid into said brake and means in said closed brake fluid circulating system responsive to reduction of said yielding pressure to atmospheric pressure to open said closed system to a replenishing supply of brake liquid, and air vent check valve means in said inlet conduit operative to permit air to enter said inlet conduit when the pressure in said conduit is less than atmospheric only.

5. In combination, a shaft, a power plant for rotating said shaft, a hydrodynamic brake associated with said shaft for retarding rotation thereof, brake fluid into said hydrodynamic brake, a closed brake fluid circulating system including an inlet conduit for conducting fluid into said brake and an outlet conduit for providing a fluid relief from said brake, a heat exchanger connecting said inlet and outlet conduits and placing said brake fluid in isolated heat transfer relation with a coolant, means connected to one of said conduits resiliently acting against the brake fluid to move the fluid in the conduits rapidly into the brake under adjustable predetermined high positive resilient pressure while maintaining confinement of the fluid in the circulating system, said means having a displaceable volume equal approximately to the fluid volume of the brake, and automatic safety fill means for adjusting the level of liquid in said fluid circulating system comprising means connected to said closed brake fluid circulating system gravitationally conducting brake fluid into said system from a reservoir of brake fluid positioned thereabove and at atmospheric pressure only when no yielding positive pressure is applied to said brake fluid, and air vent check valve means in said inlet conduit operative to permit air to enter said inlet conduit when the pressure therein is less than atmospheric only.

References Cited in the file of this patent

UNITED STATES PATENTS

| | | |
|---|---|---|
| 1,024,982 | Fottinger | Apr. 30, 1912 |
| 1,569,143 | Robinson | Jan. 12, 1926 |
| 1,992,910 | Mater | Feb. 26, 1935 |
| 2,058,063 | Cox | Oct. 20, 1936 |
| 2,511,336 | Hudson | June 13, 1950 |
| 2,748,899 | Booth et al. | June 5, 1956 |
| 2,748,900 | Booth et al. | June 5, 1956 |
| 2,750,009 | Pohl | June 12, 1956 |
| 2,963,118 | Booth et al. | Dec. 6, 1960 |

FOREIGN PATENTS

| | | |
|---|---|---|
| 1,072,941 | France | Mar. 17, 1954 |